US012663967B2

(12) United States Patent
Lim et al.

(10) Patent No.: US 12,663,967 B2
(45) Date of Patent: Jun. 23, 2026

(54) CONTEXTUALIZED AUTOMATIC CODE GENERATION USING LARGE LANGUAGE MODELS

(71) Applicant: SAP SE, Walldorf (DE)

(72) Inventors: Yuh Horng Lim, Singapore (SG); Bee Huang Tan, Singapore (SG); Ki In Tan, Singapore (SG); Xingce Bao, Singapore (SG); Yi Quan Zhou, Singapore (SG); Kham Sian Mung, Singapore (SG); Tze Shan Samantha Wong, Singapore (SG)

(73) Assignee: SAP SE, Walldorf (DE)

( * ) Notice: Subject to any disclaimer, the term of this patent is extended or adjusted under 35 U.S.C. 154(b) by 271 days.

(21) Appl. No.: 18/666,934

(22) Filed: May 17, 2024

(65) Prior Publication Data

US 2025/0355642 A1     Nov. 20, 2025

(51) Int. Cl.
| | |
|---|---|
| *G06F 21/57* | (2013.01) |
| *G06F 8/35* | (2018.01) |
| *G06F 8/71* | (2018.01) |
| *G06F 8/73* | (2018.01) |
| *G06F 11/36* | (2025.01) |
| *G06F 11/3668* | (2025.01) |
| *G06F 11/3604* | (2025.01) |

(52) U.S. Cl.
CPC ............ *G06F 8/35* (2013.01); *G06F 11/3684* (2013.01); *G06F 8/71* (2013.01); *G06F 8/73* (2013.01); *G06F 11/3608* (2013.01); *G06F 11/368* (2013.01); *G06F 21/577* (2013.01)

(58) Field of Classification Search
CPC ..... G06F 8/35; G06F 8/71; G06F 8/73; G06F 11/3684; G06F 11/368; G06F 11/3608; G06F 21/577
See application file for complete search history.

(56) References Cited

U.S. PATENT DOCUMENTS

| | | | | |
|---|---|---|---|---|
| 2024/0311922 A1* | 9/2024 | Fields | ...................... | G09B 5/06 |
| 2024/0419575 A1* | 12/2024 | Hawker | ............... | G06F 11/362 |
| 2025/0291584 A1* | 9/2025 | Meszaros | ............. | G06F 11/368 |
| 2025/0328652 A1* | 10/2025 | Vaezi | .................... | G06F 21/577 |

OTHER PUBLICATIONS

Jialu Zhang et al., Repairing Bugs in Python Assignments Using Large Language Models, Sep. 29, 2022, [Retrieved on Mar. 25, 2026]. Retrieved from the internet: <URL: https://arxiv.org/pdf/2209.14876> 12 Pages (1-12) (Year: 2022).*

\* cited by examiner

*Primary Examiner* — Anibal Riveracruz
(74) *Attorney, Agent, or Firm* — Fish & Richardson P.C.

(57) ABSTRACT

Methods, systems, and computer-readable storage media for receiving a current story representative of a function that is to be added to an application, generating a current story embedding, determining a set of historical stories at least partially by comparing the current story embedding to historical story embeddings in a set of historical error embeddings, identifying a sub-set of historical stories from the set of historical stories, the sub-set of historical stories including one or more historical stories, retrieving a historical code snippet and a test case set associated with each historical story in the sub-set of historical stories, generating a code snippet for the current story using a large language model (LLM) system, and releasing the code snippet to a code repository for integration in the application.

20 Claims, 4 Drawing Sheets

Input/Output Devices

440

420

Memory

450

Processor

410

Storage Device

430

Input/Output

400

CONTEXTUALIZED AUTOMATIC CODE GENERATION USING LARGE LANGUAGE MODELS

BACKGROUND

Software development includes developing code that is computer-executable to provide an application that executes functions. In some examples, the application executes functions that are used to support operations of an enterprise. In most cases, the application changes over time to add features (e.g., functionality). Developing features for application is a time- and resource-intensive process that requires technical expertise and consumption of technical resources.

SUMMARY

Implementations of the present disclosure are directed to developing source code for computer-executable applications. More particularly, implementations of the present disclosure are directed to a software development system that leverages large language models (LLMs) and entity matching models to automatically generate code that is contextualized to specifics of an entity, such as an enterprise.

In some implementations, actions include receiving, by a code composer, a current story representative of one or more functions that are to be added to an application, generating a current story embedding for the current story, determining a set of historical stories at least partially by comparing the current story embedding to historical story embeddings in a set of historical error embeddings, identifying, using an entity matching model, a sub-set of historical stories from the set of historical stories, the sub-set of historical stories including one or more historical stories, retrieving a historical code snippet and a test case set associated with each historical story in the sub-set of historical stories, generating a code snippet for the current story by transmitting a code prompt including the current story, one or more historical stories in the sub-set of historical stories, and one or more historical code snippets to a LLM system and receiving the code snippet from the LLM system in response to the code prompt, and releasing the code snippet to a code repository for integration in the application. Other implementations of this aspect include corresponding systems, apparatus, and computer programs, configured to perform the actions of the methods, encoded on computer storage devices.

These and other implementations can each optionally include one or more of the following features: actions further include generating a test case set for the code snippet by transmitting a test case prompt including the current story, the one or more historical stories in the sub-set of historical stories, and one or more test cases associated with the one or more historical stories to the LLM system and receiving the test case set from the LLM system in response to the test case prompt, and testing the code snippet using the test case set prior to releasing the code snippet to the code repository; actions further include revising the code snippet responsive to testing of the code snippet by transmitting a code refinement prompt including the code snippet and an output file that is descriptive of results of the testing to the LLM system and receiving a revised version of the code snippet from the LLM system in response to the code refinement prompt; the current story embedding is generated by the LLM system; each historical story embedding is generated by the LLM system; comparing the current story embedding to historical story embeddings includes determining a set of similarity scores, each similarity score representing a similarity between the current story embedding and a historical story embedding; and the entity matching model is a generic line-item matching (GLIM) model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
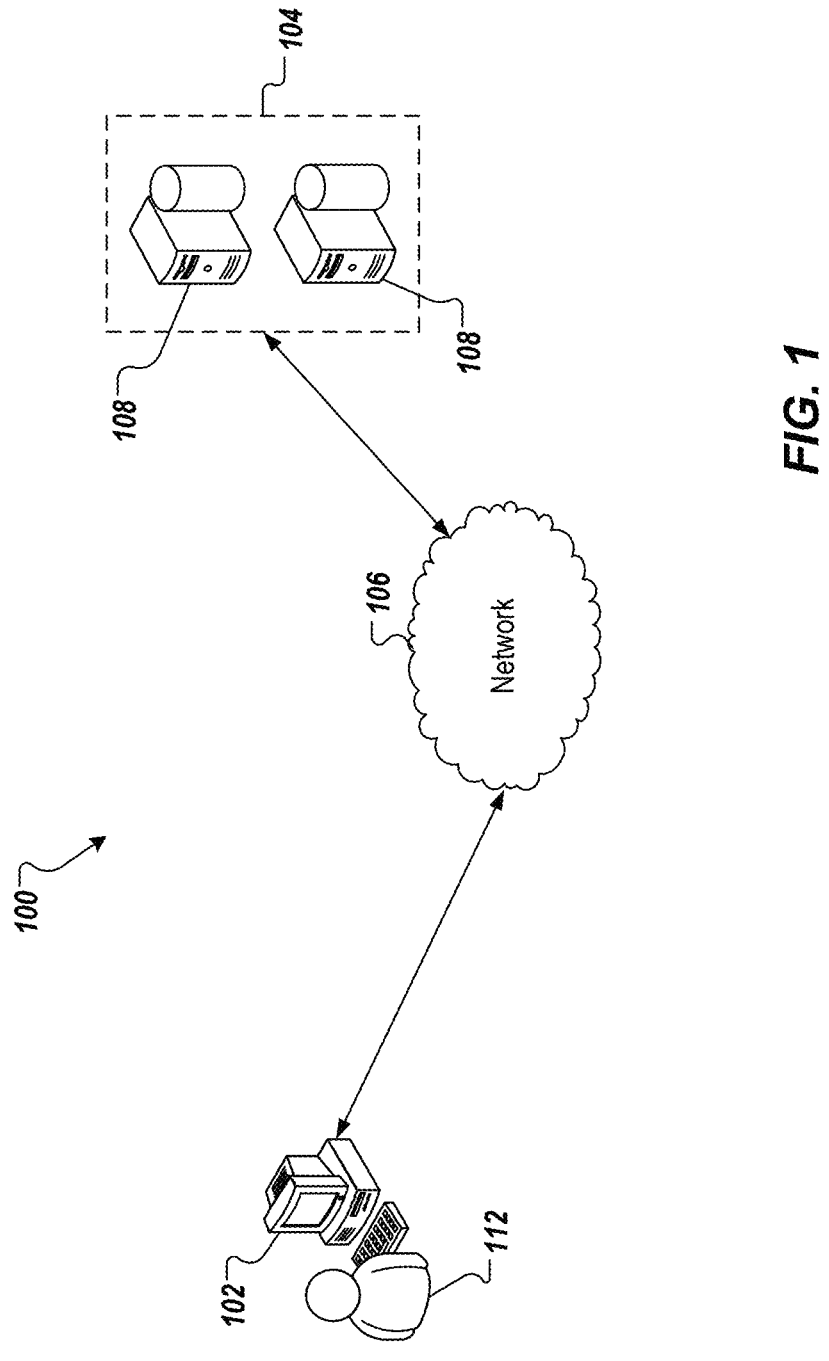
FIG. 1 depicts an example architecture that can be used to execute implementations of the present disclosure.

Implementations of the present disclosure are directed to developing source code for computer-executable applications. More particularly, implementations of the present disclosure are directed to a software development system that leverages large language models (LLMs) and entity matching models to automatically generate code that is contextualized to specifics of an entity, such as an enterprise. Implementations can include actions of receiving, by a code composer, a current story representative of one or more functions that are to be added to an application, generating a current story embedding for the current story, determining a set of historical stories at least partially by comparing the current story embedding to historical story embeddings in a set of historical error embeddings, identifying, using an entity matching model, a sub-set of historical stories from the set of historical stories, the sub-set of historical stories including one or more historical stories, retrieving a historical code snippet and a test case set associated with each historical story in the sub-set of historical stories, generating a code snippet for the current story by transmitting a code prompt including the current story, one or more historical stories in the sub-set of historical stories, and one or more historical code snippets to a LLM system and receiving the code snippet from the LLM system in response to the code prompt, and releasing the code snippet to a code repository for integration in the application.

To provide further context for implementations of the present disclosure, and as introduced above, software development includes developing code that is computer-executable to provide an application that executes functions. In some examples, the application executes functions that are used to support operations of an enterprise. In most cases, the application changes over time to add features (e.g., functionality). Developing features for application is a time- and resource-intensive process that requires technical expertise and consumption of technical resources (processors, memory).

Further, features can be specific to the context of an enterprise that the application is being used by. Here, developing a new feature for an application within an enterprise not only requires coding expertise, but also a significant amount of domain knowledge and understanding of the existing tools and libraries that the enterprise utilizes in existing features within the application. As each enterprise has their own configuration and usage of tools, when developing a new feature, it is important for the developers to understand how to utilize the tools and libraries provided within the enterprise. Despite the emergence of artificial intelligence (AI) assistants that generate code in response to prompts, such AI assistants lack the ability to customize and align code according to the existing codebase of an enterprise.

In view of the above context, implementations of the present disclosure provide a software development system that leverages LLMs and entity matching models to automatically generate code that is contextualized to specifics of an entity, such as an enterprise. More particularly, the LLM automatically fills in parts of an application by composing a code snippet using relevant historical code snippets that are identified by the entity matching model (e.g., a trained generic line-item matching (GLIM) model) based on similarities between a user story and historical user stories. The historical user stories and corresponding code snippets and test cases are stored in a database for subsequent retrieval and code generation. The code snippet and the test cases are sent to a test system for functionality verification. In some examples, the code snippet is iteratively refined and corrected by the LLM until all test cases pass. After passing testing, the code snippet is uploaded to a code repository (e.g., a version control system) to be available for developers to integrate the code snippet into the application and/or to further polish the code snippet as desired.

As used herein, a user story, also referred to herein as a story, can be described as a natural language, general description of one or more features to be provided by an application and is written from the perspective of end users. Each story articulates how the feature(s) provide(s) value to end users and uses non-technical language to provide context for development of code that provides the feature in the application.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a software development system for contextualized, automatic code generation using LLMs. As described in further detail herein, the software development system interacts with a LLM and an entity matching model to provide code, also referred to herein as code snippet that can be executed to provision a feature in an application. In some examples, the user 112 interacts with the software development system by providing a story that is processed by the software development system to generate code, as described in further detail herein. In some examples, the LLM and/or the entity matching model are also hosted within the server system 104.

Figure 2:
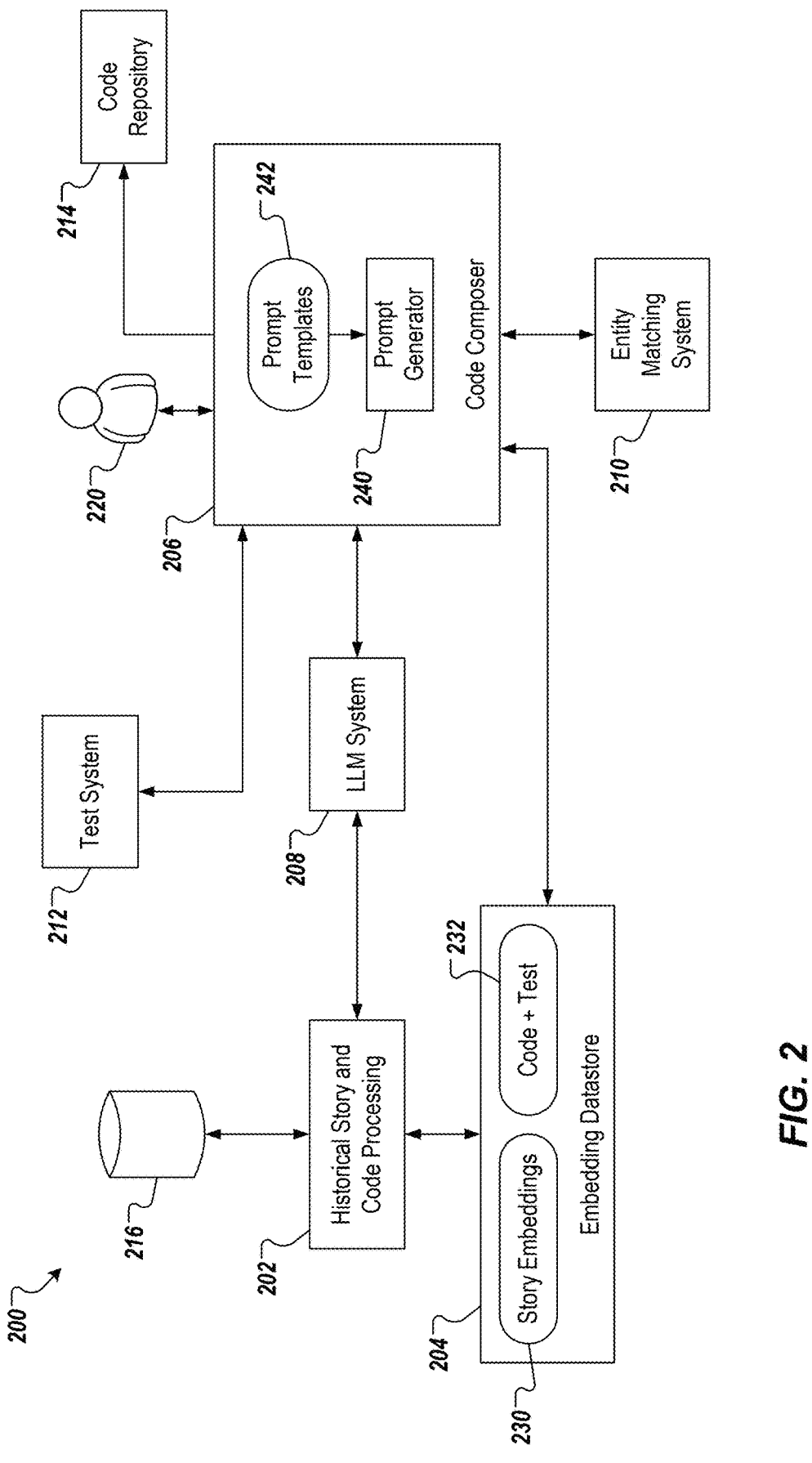
FIG. 2 depicts an example conceptual architecture of a software development system in accordance with implementations of the present disclosure.

FIG. 2 depicts an example conceptual architecture 200 of a software development system in accordance with implementations of the present disclosure. In the depicted example, the conceptual architecture 200 includes a historical story and code processing module 202, an embedding datastore 204, a code composer 206, a LLM system 208, an entity matching system 210, a test system 212, a code repository 214, and a historical story and code datastore 216. In some examples, the story and code datastore 216 stores a set of stories and, for each story, a code snippet that had been developed to address the story. In some examples, a test case set is also stored for each code snippet and includes test cases used to test the code snippet. As described in further detail herein, a user 220 can interact with the code composer to have a code snippet automatically generated for a story that the user 220 is handling. In some examples, the code snippet that is automatically generated is tested using the test system 212 and is stored in the code repository 214.

In the example of FIG. 2, the embedding datastore 204 stores story embeddings 230, and code snippets and test cases 232, described in further detail herein. The code composer 206 includes a prompt generator 240 and a set of prompt templates 242.

In some implementations, the historical story and code processing module 202 extracts historical story and code snippet pairs. Each historical story and code snippet pair representing a story and a code snippet that had been previously developed, tested, and deployed to provision one or more features of the story. In some examples, each historical story and code snippet pair is associated with a test case set that had been used to test the code snippet prior to deployment. In some implementations, the historical story and code processing module 202 sends embedding requests to the LLM system 208 for each historical story and code snippet pair. In response to the embedding requests, the LLM system 208 processes each historical story to generate a historical story embedding that is stored in the embedding datastore 204. In general, a historical story embedding can be described as a multi-dimensional vector of numerical values that provides a numerical representation of the historical story in an embedding space. In some examples, the test case set for the historical story and code snippet pair is also stored in the datastore 204 (e.g., indexed to the code snippet).

In accordance with implementations of the present disclosure, the user 220 can request generation of a code snippet for a story. For example, the user 220 can want a new feature to be added to an application and prepare a story that is descriptive of the new feature (e.g., from an end user's perspective, as discussed above). The user 220 inputs the story to the code composer 206, which sends an embedding request to the LLM system 208. In response to the embedding request, the LLM system 208 processes the story to provide a current story embedding that is a numerical representation of the story. In some examples, the current story embedding can be provided as a multi-dimensional, numerical vector that represents the historical story in the embedding space (e.g., the same embedding space used for the historical story embeddings).

In some implementations, the code composer 206 queries the embedding store 204 for a set of matching historical stories. For example, the embedding store 204 is queried based on the current story embedding and a set of top-k matching historical stories is returned (e.g., top-3 matching historical stories). In some implementations, to determine the top-k matches for the current story, the current story embedding is compared to each historical story embedding in the embedding datastore 204.

In some examples, comparing can include determining a similarity between the current story embedding and each historical story embedding. An example similarity can include, without limitation, a cosine similarity, which can be described as a measure of similarity between vectors of an inner product space and is calculated as a cosine of the angle between the vectors. In some examples, the cosine similarity can be in a range of [1, −1], inclusive. Here, if two vectors are identical, the cosine similarity is equal to 1. The cosine similarity is increasingly less than 1 as the vectors being compared are increasingly dissimilar. In some examples, a set of similarity scores is determined for the current story embedding, similarity scores in the set of similarity scores are put in rank order from highest to lowest, and the top-k similarity scores are selected. The historical stories that correspond to the top-k similarity scores are returned as a set of matching historical stories (top-k historical stories) for the current story.

In accordance with implementations of the present disclosure, the current story and the set of matching historical stories are input to the entity matching system 210, which executes an entity matching model to match the current story to one or more historical stories. That is, for the current error, the entity matching model identifies at least one historical story of the set of historical stories as a match.

In further detail, the entity matching model is provided as a classifier that is trained to predict entity pairs to a fixed set of class labels ($\vec{l}$) (e.g., $l_0$, $l_1$). For example, the set of class labels ($\vec{l}$) can include 'no match' ($l_0$) and 'match' ($l_1$). In some examples, the entity matching model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \end{pmatrix}$$

where $\vec{p} = \{p_0, p_1\}$. In some examples, $p_0$ is a prediction probability (also referred to herein as confidence c) of the item pair $\vec{a}$, $\vec{b}$ belonging to a first class (e.g., no match) and $p_1$ is a prediction probability of the item pair $\vec{a}$, $\vec{b}$ belonging to a second class (e.g., match).

Here, $p_0$ and $p_1$ can be provided as numerical values indicating a likelihood (confidence) that the item pair $\vec{a}$, $\vec{b}$ belongs to a respective class. In some examples, the entity matching model can assign a class to the item pair $\vec{a}$, $\vec{b}$ based on the values of $p_0$ and $p_1$. In some examples, the entity matching model can assign the class corresponding to the highest value of $p_0$ and $p_1$. For example, for an entity pair $\vec{a}$, $\vec{b}$, the entity matching model can provide that $p_0 = 0.13$ and $p_1 = 0.98$. Consequently, the entity matching model can assign the class 'match' ($l_1$) to the item pair $\vec{a}$, $\vec{b}$. In the context of the present disclosure, the query entity ($\vec{a}$) can be based on the current story and the target entity ($\vec{b}$) can be based on a historical story in the set of historical stories. For example, the query entity ($\vec{a}$) can be the text of the story and the target entity ($\vec{b}$) can be the text of the historical story.

In some implementations, the entity matching model is provided as a GLIM model, which treats the text of stories as line-items and attempts to match line-items between the current story (query entity) and each historical story (target entity). In some examples, the GLIM model is trained on training data that represents matches and non-matches between story texts. In some examples, multiple matches can occur, in which the GLIM model predicts that the current story (query entity) matches to multiple historical stories (target entities).

In accordance with implementations of the present disclosure, the entity matching system 210 returns (to the code composer 206), one or more matched pairs, each matched pair including the current story and a historical story that is determined to match the current story. In some examples, for each matched pair, a historical code snippet and test case set are provided. For example, for a matched pair, the code composer 206 can query the embedding datastore 204 using the historical story of the matched pair and the embedding datastore 204 returns a historical code snippet and test case set that is associated with the historical story (e.g., the historical code snippet used to provision feature(s) of the historical story in an application, test cases used to test the code snippet before deployment).

In accordance with implementations of the present disclosure, the code composer 206 queries the LLM system 208 for the current story, which returns a code snippet that can be executed to provision feature(s) represented by the current story. For example, and as described in further detail herein, instead of using the historical code snippet(s) returned for the matching historical stor(y/ies), the LLM system 208 processes a prompt that is based on the historical code snippet(s) to provide a (new) code snippet that is specific to feature(s) represented in the current story.

In further detail, the prompt generator 240 generates a prompt for the current story based on a code prompt template in the set of prompt templates 242. In some examples, the code prompt template includes placeholders that are populated with values that are provided from the current story and placeholders that are populated with values from the historical code snippet(s) returned for the current story. Listing 1 provides an example of a code prompt template:

---

Listing 1: Example Code Prompt Template

```
# {stories} is a list containing the historical stories from the matched
GLIM output.
# {snippets} is a list containing the historical code snippets from the
matched GLIM output.
# {user_story} is the current story provided by the code owner.
prompt = f"""
    Please write a code snippet that fulfils the given user story:
    {user_story},
        based on the historical data. Here are several examples for you to
        learn:
        {''.join(f"
            Example {idx}: For user story {st}: the matching code
            would be {sn}
            ''' for idx, (st, sn) in enumerate(zip(stories, snippets))}
```

---

In response to the code prompt, the LLM system 208 can return a code snippet.

In accordance with implementations of the present disclosure, the code snippet is tested using a test case set and can be iteratively modified to correct errors in the code snippet. More particularly, the code composer 206 queries the LLM system 208 for a test case set that can be used to test the code snippet. For example, the code composer 206 uses a test case prompt template of the set of prompt templates 242 to prompt the LLM system 208. Listing 2 provides an example of a test case prompt template:

---

Listing 2: Example Test Case Prompt Template

```
# {stories} is a list containing the past user stories from the matched
GLIM output.
# {user_story} is the user story provided by the code owner.
# {test_cases} is a list containing the past test cases from the matched
GLIM output
prompt = f"""
    Generate unit test cases from the given user story {user_story},
    based on the historical data. Here are several examples for you to
    learn:
    {''.join(f"
        Example {idx}: For user story {st}: the matching code
        would be {sn}
        ''' for idx, (st, sn) in enumerate(zip(stories, test_cases))}
```

---

In response to the test case prompt, the LLM system 208 can return a test case set.

In some implementations, the code snippet and test case set are loaded to the test system 212, which executes unit tests of the test case set and provides an output file that includes results of each test case. In some examples, if the results show that all test cases passed, the code snippet need not be refined and can be released to the code repository 214. In some examples, if the results show that at least one test case was failed, the code composer 206 prompts the LLM system 208 to refine the code snippet. In some examples, the code composer 206 uses a code refinement prompt template of the set of prompt templates 242 to prompt the LLM system 208. Listing 3 provides an example of a code refinement prompt template:

---

Listing 3: Example Code Refinement Prompt Template

```
# {script} is the LLM generated code snippet based on provided user story
and historical code
# {output} is a string containing the text in the output file from the unit
tests prompt = f"""
    Given the script you created previously, {script}, and the output
    file from the unit tests, {output}, do the following:
    1. Extract the test results from the output file and list the unit test
    number with the test result (... denotes remaining unit tests and
    results) e.g.
    Unit test 1: <test result 1>, Unit test 2: <test result 2> ...
    2. Identify the code that caused the failed test case and correct it,
    then produce the fixed script.
    """
```

---

In response to the code refinement prompt, the LLM system 208 can return a refined version of the code snippet. This process can be repeated until all of the test cases are passed and the code snippet is released to the code repository 214.

Figure 3:
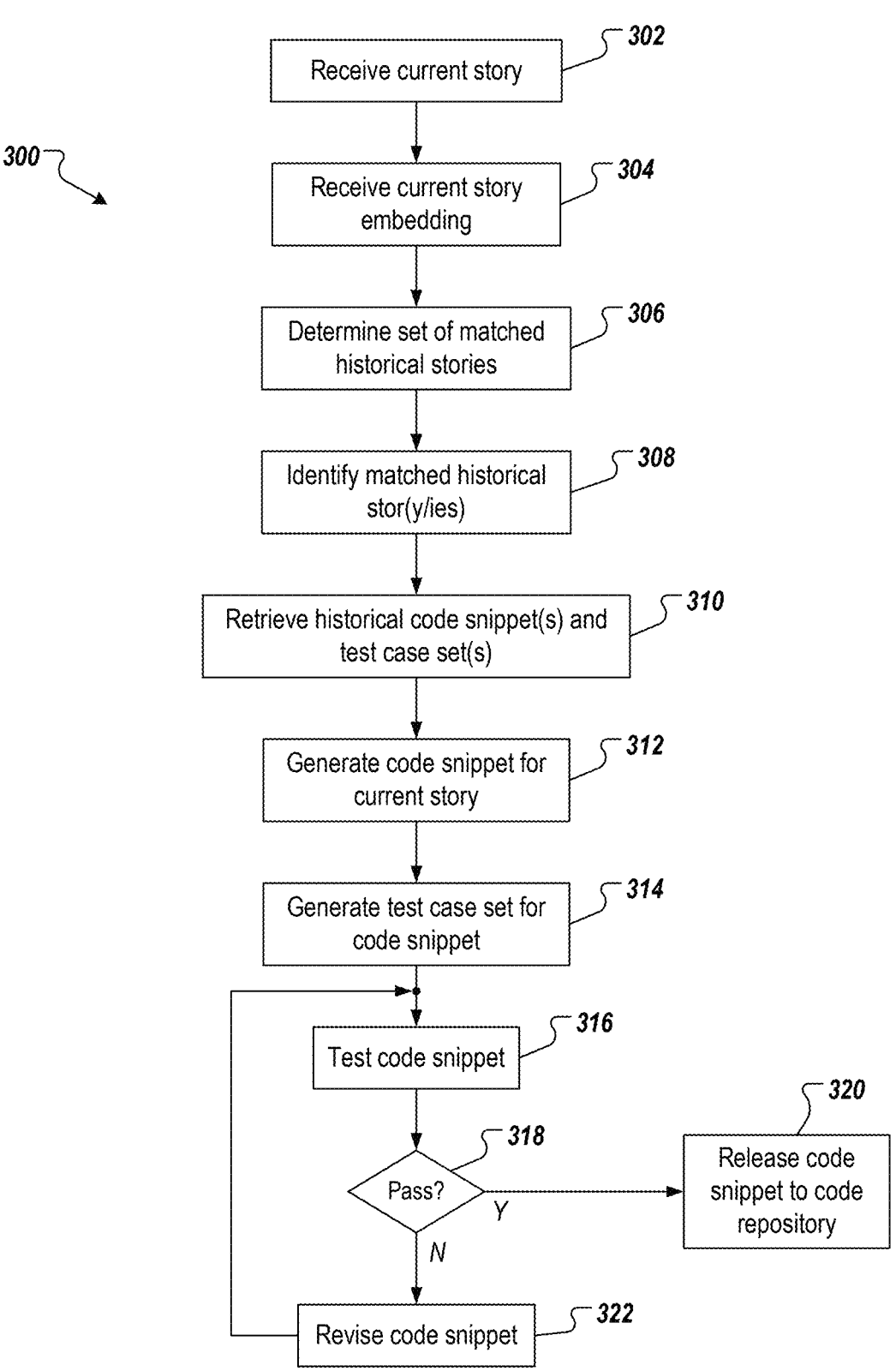
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A current story is received (302). For example, and as described herein, the code composer 206 receives a current story that represents one or more features (new feature(s)) that are to be provided by an application. In some examples, the current story is provided to the code composer 206 by the user 220. In some examples, the current story is provided to the code composer 206 by a system (e.g., a service management system). A current story embedding is received (304). For example, and as described herein, the code composer 206 can prompt the LLM system 208 to provide a current story embedding for the current story, the prompt including the current story and a request to generated a current story embedding. The code composer 206 receives the current story embedding from the LLM system 208 in response to the prompt.

A set of matched historical stories is determined (306). For example, and as described herein, the code composer 206 queries the embedding datastore 204 using the current story embedding, the query requesting a set of matched historical stories to be returned. In some examples, and as described herein, the current story embedding is compared to each historical story embedding stored in the embedding datastore 204 (e.g., using cosine similarity) and a set of matched historical story embeddings is determined. In some examples, the set of matched historical story embeddings includes a top-k (e.g., top-3) matching historical story embeddings (e.g., ranking the historical story embeddings by cosine similarity score and selecting the top-k). In some examples, the historical code snippets corresponding to the historical story embeddings in the set of matched historical story embeddings are retrieved from the embedding datastore 204 and are included in the set of matched historical stories that is returned to the code composer 206. In some examples, for each historical story in the set of matched historical stories, a test case set is also returned.

At least one matched historical story is identified (308). For example, and as described herein, the code composer 206 queries the entity matching system 210 using the current story and the set of matched historical stories, the entity matching system 210 identifying a sub-set of historical stories (e.g., one or more historical stories of the set of matched historical stories) as matching the current story. A historical code snippet and test case set is retrieved (310). For example, and as described herein, for each historical story in the sub-set of historical stories, the code composer 206 queries the embedding data store 204 for the historical code snippet and test case set associated with the historical story (i.e., the historical code snippet being the code provided to realize the historical story, the test case set having been used to test the historical code snippet prior to release).

A code snippet is generated for the current story (312). For example, and as described herein, the code composer 206 (e.g., the prompt generator 240) generates a code prompt using a code prompt template of the set of templates 242. In some examples, placeholders of the code prompt template are populated with the historical stor(y/ies), the historical code snippet(s), and the current story (see, e.g., Listing 1). A test case set is generated for the code snippet (314). For example, and as described herein, the code composer 206 (e.g., the prompt generator 240) generates a test case prompt using a test case prompt template of the set of templates 242. In some examples, placeholders of the test case prompt template are populated with the historical stor(y/ies), the test case sets associated with the historical stor(y/ies), and the current story (see, e.g., Listing 2).

The code snippet is tested (316). For example, and as described herein, the code snippet and the test case set (returned to the code composer 206 from the LLM system 208) are provided to the test system 212, which executes the code snippet over the test case set. It is determined whether the code snippet passed testing (318). For example, and as described herein, if the code snippet passes all test cases in the test case set, the code snippet is determined to have passed testing. If the code snippet passed testing, the code snippet is released to a code repository (320). For example, and as described herein, the code composer 206 releases the code snippet to the code repository 214. If the code snippet did not pass testing, the code snippet is revised (322) and is again tested. For example, and as described herein, the code composer 206 (e.g., the prompt generator 240) generates a code refinement prompt using a code refinement prompt template of the set of templates 242. In some examples, placeholders of the code refinement prompt template are populated with the code snippet and an output file that is descriptive of results of the testing (see, e.g., Listing 3). The code snippet is revised by the LLM system 208 responsive to the prompt and is again tested using the test case set.

Implementations of the present disclosure achieve multiple technical improvements. For example, implementations of the present disclosure provide a no-code approach (e.g., no coding by human developers) for the development of new features that fit the context (e.g., practice, standards, libraries, tools) of an enterprise, reducing the demand for developers that possess expertise and technical skills required for developing features. More particularly, implementations of the present disclosure enable automated generation of code that is localized to the enterprise. As the code generated will adopt and utilize the enterprise's proprietary tools and software, it will allow the enterprise to streamline the tools and services that they are currently managing with optimization that improves costs, such as consumption of technical resources (processors, memory). Implementations of the present disclosure also provide a mechanism of self-adaption, where, as a database is constantly updated with new user stories accompanied by the corresponding code snippets and test case sets, the greater collection improves the LLM's few-shot learning capabilities. This enables the LLM to generate better code and ultimately leads to a quicker delivery time and further reduction in technical resources consumed.

Figure 4:
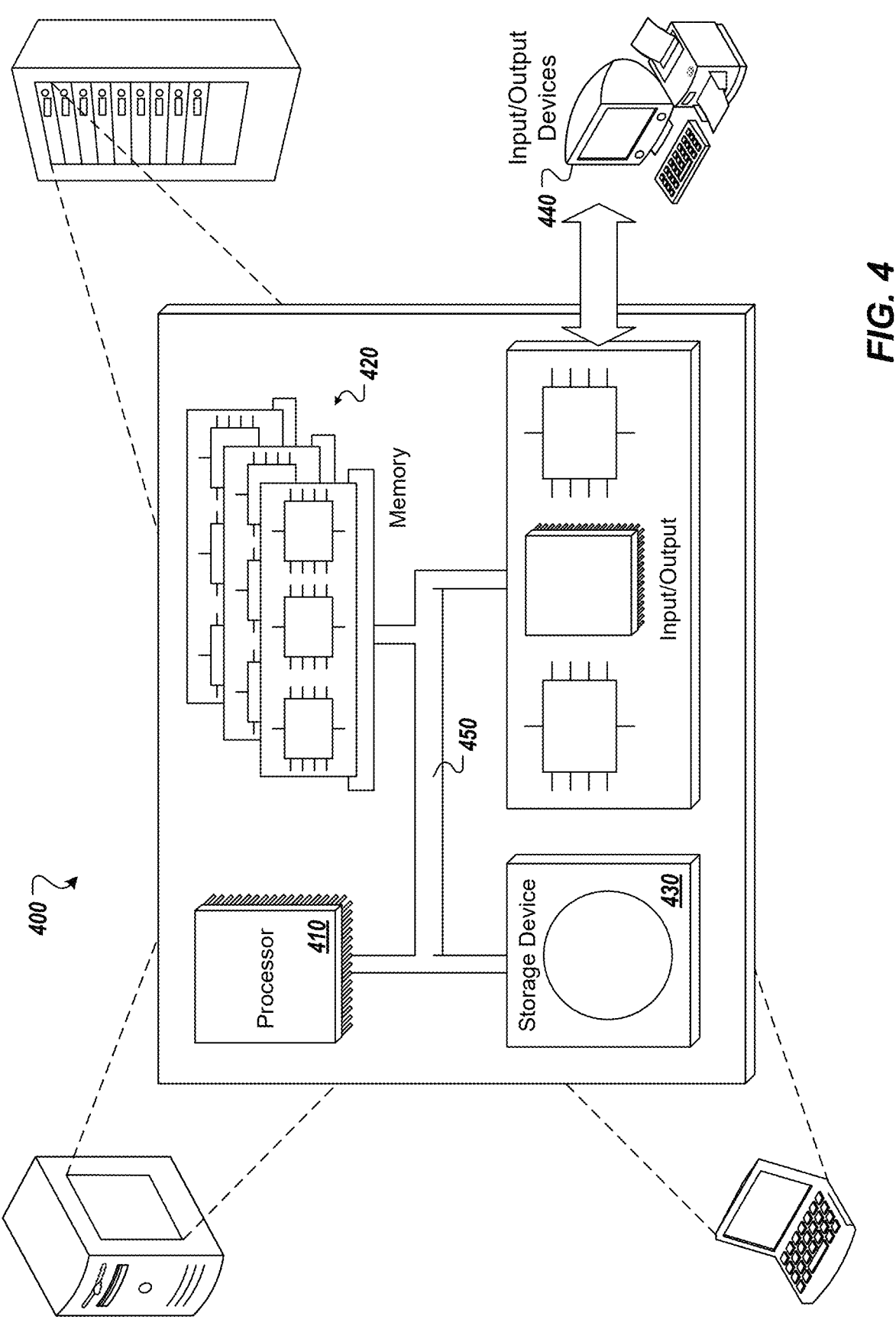
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automated generation of computer-executable code responsive to a user story, the method being executed by one or more processors and comprising:

receiving, by a code composer, a current story representative of one or more functions that are to be added to an application;

generating a current story embedding for the current story;

determining a set of historical stories at least partially by comparing the current story embedding to historical story embeddings in a set of historical error embeddings;

identifying, using an entity matching model, a sub-set of historical stories from the set of historical stories, the sub-set of historical stories comprising one or more historical stories;

retrieving a historical code snippet and a test case set associated with each historical story in the sub-set of historical stories;

generating a code snippet for the current story by transmitting a code prompt comprising the current story, one or more historical stories in the sub-set of historical stories, and one or more historical code snippets to a large language model (LLM) system and receiving the code snippet from the LLM system in response to the code prompt; and releasing the code snippet to a code repository for integration in the application.

2. The method of claim 1, further comprising:

generating a test case set for the code snippet by transmitting a test case prompt comprising the current story, the one or more historical stories in the sub-set of historical stories, and one or more test cases associated with the one or more historical stories to the LLM system and receiving the test case set from the LLM system in response to the test case prompt; and testing the code snippet using the test case set prior to releasing the code snippet to the code repository.

3. The method of claim 1, further comprising revising the code snippet responsive to testing of the code snippet by:

transmitting a code refinement prompt comprising the code snippet and an output file that is descriptive of results of the testing to the LLM system and receiving a revised version of the code snippet from the LLM system in response to the code refinement prompt.

4. The method of claim 1, wherein the current story embedding is generated by the LLM system.

5. The method of claim 1, wherein each historical story embedding is generated by the LLM system.

6. The method of claim 1, wherein comparing the current story embedding to historical story embeddings comprises determining a set of similarity scores, each similarity score representing a similarity between the current story embedding and a historical story embedding.

7. The method of claim 1, wherein the entity matching model comprises a generic line-item matching (GLIM) model.

8. A non-transitory computer-readable storage medium coupled to one or more processors and having instructions stored thereon which, when executed by the one or more processors, cause the one or more processors to perform operations for automated generation of computer-executable code responsive to a user story, the operations comprising:

receiving, by a code composer, a current story representative of one or more functions that are to be added to an application;

generating a current story embedding for the current story;

determining a set of historical stories at least partially by comparing the current story embedding to historical story embeddings in a set of historical error embeddings;

identifying, using an entity matching model, a sub-set of historical stories from the set of historical stories, the sub-set of historical stories comprising one or more historical stories;

retrieving a historical code snippet and a test case set associated with each historical story in the sub-set of historical stories;

generating a code snippet for the current story by transmitting a code prompt comprising the current story, one or more historical stories in the sub-set of historical stories, and one or more historical code snippets to a large language model (LLM) system and receiving the code snippet from the LLM system in response to the code prompt; and releasing the code snippet to a code repository for integration in the application.

9. The non-transitory computer-readable storage medium of claim 8, wherein operations further comprise:

generating a test case set for the code snippet by transmitting a test case prompt comprising the current story, the one or more historical stories in the sub-set of historical stories, and one or more test cases associated with the one or more historical stories to the LLM system and receiving the test case set from the LLM system in response to the test case prompt; and testing the code snippet using the test case set prior to releasing the code snippet to the code repository.

10. The non-transitory computer-readable storage medium of claim 8, wherein operations further comprise revising the code snippet responsive to testing of the code snippet by:

transmitting a code refinement prompt comprising the code snippet and an output file that is descriptive of results of the testing to the LLM system and receiving a revised version of the code snippet from the LLM system in response to the code refinement prompt.

11. The non-transitory computer-readable storage medium of claim 8, wherein the current story embedding is generated by the LLM system.

12. The non-transitory computer-readable storage medium of claim 8, wherein each historical story embedding is generated by the LLM system.

13. The non-transitory computer-readable storage medium of claim 8, wherein comparing the current story embedding to historical story embeddings comprises determining a set of similarity scores, each similarity score representing a similarity between the current story embedding and a historical story embedding.

14. The non-transitory computer-readable storage medium of claim 8, wherein the entity matching model comprises a generic line-item matching (GLIM) model.

15. A system, comprising:

a computing device; and a computer-readable storage device coupled to the computing device and having instructions stored thereon which, when executed by the computing device, cause the computing device to perform operations for automated generation of computer-executable code responsive to a user story, the operations comprising:

receiving, by a code composer, a current story representative of one or more functions that are to be added to an application;

generating a current story embedding for the current story;

determining a set of historical stories at least partially by comparing the current story embedding to historical story embeddings in a set of historical error embeddings;

identifying, using an entity matching model, a sub-set of historical stories from the set of historical stories, the sub-set of historical stories comprising one or more historical stories;

retrieving a historical code snippet and a test case set associated with each historical story in the sub-set of historical stories;

generating a code snippet for the current story by transmitting a code prompt comprising the current story, one or more historical stories in the sub-set of historical stories, and one or more historical code snippets to a large language model (LLM) system and receiving the code snippet from the LLM system in response to the code prompt; and releasing the code snippet to a code repository for integration in the application.

16. The system of claim 15, wherein operations further comprise:

generating a test case set for the code snippet by transmitting a test case prompt comprising the current story, the one or more historical stories in the sub-set of historical stories, and one or more test cases associated with the one or more historical stories to the LLM system and receiving the test case set from the LLM system in response to the test case prompt; and testing the code snippet using the test case set prior to releasing the code snippet to the code repository.

17. The system of claim 15, wherein operations further comprise revising the code snippet responsive to testing of the code snippet by:

transmitting a code refinement prompt comprising the code snippet and an output file that is descriptive of results of the testing to the LLM system and receiving a revised version of the code snippet from the LLM system in response to the code refinement prompt.

18. The system of claim 15, wherein the current story embedding is generated by the LLM system.

19. The system of claim 15, wherein each historical story embedding is generated by the LLM system.

20. The system of claim 15, wherein comparing the current story embedding to historical story embeddings comprises determining a set of similarity scores, each similarity score representing a similarity between the current story embedding and a historical story embedding.

* * * * *